United States Patent [19]

Dantzler et al.

[11] 4,115,779

[45] Sep. 19, 1978

[54] AUTOMOBILE TRUNK ANTENNA MOUNT

[75] Inventors: Danny M. Dantzler, Lincoln, Nebr.; James Bartley Meehan, Waterloo, Iowa; Wayne Fredrick Everman, Cedar Falls, Iowa; Donald E. Fluent, Cedar Falls, Iowa; Howard George Sachs, Lincoln, Nebr.

[73] Assignee: Instrumentation Specialties Company, Lincoln, Nebr.

[21] Appl. No.: 686,310

[22] Filed: May 14, 1976

[51] Int. Cl.² .................................................. H01G 1/32

[52] U.S. Cl. ...................................... 343/715; 343/882

[58] Field of Search ................. 343/713, 715, 882, 900

[56] References Cited

U.S. PATENT DOCUMENTS

| | | | |
|---|---|---|---|
| 2,946,842 | 7/1960 | Chadowski | 343/713 |
| 3,181,163 | 4/1965 | Kozlow et al. | 343/882 |
| 3,304,037 | 2/1967 | Candela | 343/882 |
| 3,369,247 | 2/1968 | Bacow | 343/715 |
| 3,453,618 | 7/1969 | Ukmar et al. | 343/715 |
| 3,555,551 | 1/1971 | Gronlund | 343/715 |
| 3,886,560 | 5/1975 | Mortensen et al. | 343/882 |
| 3,944,722 | 3/1976 | Larsen | 343/715 |

FOREIGN PATENT DOCUMENTS

| | | | |
|---|---|---|---|
| 1,332,513 | 2/1960 | France | 343/715 |
| 1,225,820 | 2/1960 | France | 343/715 |

*Primary Examiner*—Eli Lieberman

*Attorney, Agent, or Firm*—Vincent L. Carney

[57] ABSTRACT

To electrically and mechanically connect an antenna to an automobile, a trunk-lid antenna mount includes: (1) a conductive pin that is connected to a printed circuit board at one of its ends and is spring loaded against the base of a pivotally mounted radiator at its other end, with the contacting portions of the base of the radiator and the pin being serrated so that the radiator can be pivoted to different positions by rotating it; (2) a ground strap that electrically contacts the printed circuit at one end and is riveted by a conductive rivet to a trunk-lid bracket at its other end, with an aperture between the two ends receiving the outer conductor of the coaxial cable, the inner conductor of which passes through the aperture and is connected to an eyelet in the printed circuit board; and (3) a mounting cap that includes the antenna base and the conductive pin and snaps onto the base of the antenna mount.

14 Claims, 3 Drawing Figures

AUTOMOBILE TRUNK ANTENNA MOUNT

This invention relates to antenna mounts.

In one class of antenna mount, the base of the antenna mount is fastened to the body of a vehicle such as to the lid of the trunk of an automobile by a bracket. A coaxial cable leading from the antenna mount to the radio has its external conductor connected to ground in the base through the bracket and has its inner conductor connected to the radiator through a printed circuit inductance. The radiator is mounted on a cap of the antenna mount which is fastened to the base.

In a prior art antenna mount of this class, the outer conductor of the coaxial cable is electrically connected to a screw of the bracket in an operation that requires a plurality of steps not necessary for other purposes, such as by extracting the inner conductor through a portion of the outer conductor and connecting the free end portion of the outer conductor to ground. The cap of the mount is fastened by screw threads or by separate screws or bolts to the base of the antenna mount and the antenna mount is normally of metal.

This type of prior art antenna mount has several disadvantages such as: (1) the antenna is not easily adjustable from position to position; (2) it is expensive to fabricate and assemble; and (3) it is relatively easy for an unauthorized person to remove the radiator or whip from its place of installation. One expense in assembling the unit is the cost of grounding the outer conductor of the coaxial cable. Another expense of fabrication and of assembling is the formation of the screw threads and cost of assembling parts which are threaded together or bolted together.

Accordingly, it is an object of the invention to provide a novel antenna mount.

It is a further object of the invention to provide an antenna mount in which a ground connection to the coaxial cable is inexpensively provided.

It is a still further object of the invention to provide an inexpensive antenna.

It is a still further object of the invention to provide a plastic antenna mount, parts of which are easily snapped together.

It is a still further object of the invention to provide an antenna mount in which the position of a radiator is easily adjustable.

It is a still further object of the invention to provide an antenna that is difficult for an unauthorized person to remove from an automobile.

In accordance with the above and further objects of the invention, an antenna mount includes a base assembly, a mounting cap assembly and a mast, whip or radiator assembly.

The base assembly is mounted to the trunk lid of an automobile and provides an economically constructed arrangement for electrical and mechanical mounting. For these two purposes, the base assembly has two apertures in its bottom surface, one of which receives the coaxial cable and the other of which receives a central portion of a conductive rivet which is bent outwardly on its bottom side to hold one end of a mounting bracket and on its top side to hold one end of a ground strap. The ground strap has: (1) a second aperture which engages the outer conductor of the coaxial cable to form a ground connection through the mounting bracket and rivet; and (2) an upwardly extending arm with an outwardly extending tab that electrically contacts a printed circuit coil mounted within the base.

To permit the radiator to be easily adjusted in position, the base of the whip radiator in the radiator assembly includes an annular serrated portion which is spring biased against an annular serrated portion of a conductive pin in the mounting cap. This conductive pin includes a prong that extends downwardly and contacts an eyelet in the printed circuit within the base assembly of the antenna mount. The base of the whip radiator is mounted within a swivel top which is rotatable about a pivot point so that the radiator can be adjusted in position by rotating it manually.

To permit easy assembly of the mounting cap to the base of the antenna, the base and cap are formed of plastic, with the mounting cap having a skirt which fits over an upper wall of the base. The skirt includes inwardly extending fingers that are aligned with complimentarily formed apertures in the upper wall of the base, thus permitting the base and mounting cap to snap together.

As can be understood from the above description, the antenna mount of this invention has the advantages of: (1) being inexpensive to assemble and fabricate; (2) permitting the easy adjustment of a radiator to different angles; and (3) being relatively theft proof. The low cost of fabrication is at least partly due to the connection of the outer conductor of the coaxial cable to ground through the ground strap which is advantageously connected to the bracket through a central aperture in the bottom of the antenna mount and by its plastic snap-together construction.

The above noted and other features of the invention will be better understood from the following detailed description when considered with reference to the accompanying drawings in which.

Figure 1:
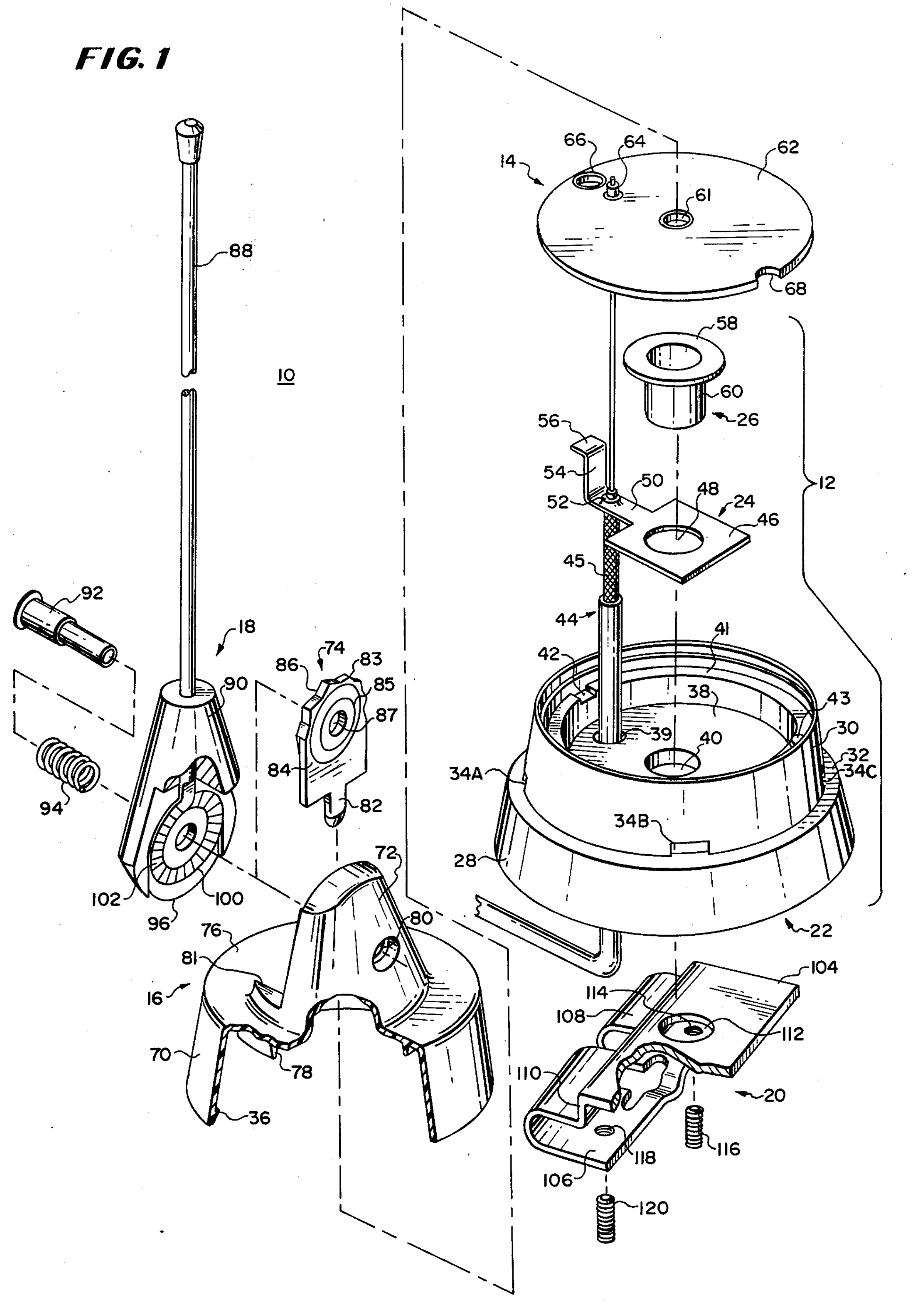
FIG. 1 is a fragmentary, exploded perspective view of an antenna in accordance with the invention.

In FIG. 1, there is shown in an exploded perspective view an automobile trunk antenna having a base assembly 12, a printed circuit board 14, a mounting cap assembly 16, and a mast or whip radiator assembly 18. The base assembly 12 is mounted by a metal clip or bracket to the trunk of the automobile and supports the printed circuit board 14, with the mounting cap assembly 16 snapping into place over and upon the base assembly 12 to cover the printed circuit board 14. The cap assembly 16 includes means to mount the radiator assembly 18 to the base assembly 12.

To mount the printed circuit board 14, mounting cap assembly 16 and radiator 18 to the trunk of the automobile and connect the ground conductor to the automobile, the base assembly 12 includes a clip 20, a plastic annular base 22, a ground strap 24, and a conductive rivet 26. The plastic base 22 includes a downwardly extending skirt 28 which receives the top portion of the metal clip 20 for mounting to the trunk and an upwardly extending base wall 30 connected to the skirt 28 by a shoulder 32. The wall 30 and shoulder 32 are of a shape and size relative to the mounting cap assembly 16 to permit the mounting cap assembly 16 to fit around the outside of the wall 30 and rest against the shoulder 32. The interior of the base wall 30 is shaped to receive the ground strap 24, the conductive rivet 26 and the printed circuit board 14, as will be described in greater detail hereinafter.

To receive the metal clip 20, the downwardly extending skirt 28 is substantially shaped as a right-regular truncated cone as will be described more completely in connection with FIG. 2. It is larger in cross section than the upwardly extending base wall 30 which has the general shape of a smaller cone so as to form the annular shoulder 32 against which the bottom edge of the mounting cap assembly 16 fits. The base wall 30 includes four rectangular recesses, one of which is completely shown in FIG. 1 and two others of which are shown partly at 34A, 34B and 34C directly adjacent to the shoulder 32. These recesses receive corresponding fingers on the mounting cap assembly 16, one of which is shown at 36 to align the mounting cap assembly 16 with the base assembly 22 and hold it in place once inserted.

The recesses and fingers are symmetrically located at 90 degree increments around the base and cap to permit the cap assembly to assume different orientations about the vertical axis of the antenna for a purpose to be described hereinafter. While recesses in the base wall 30 and fingers in the cap 16 serve to hold the cap and base together in the preferred embodiment, other types of blind releases are suitable. For example, vertical apertures in the shoulder 32 may cooperate with fingers extending downwardly from the edge of the mounting cap, positioned to align with the vertical apertures and of sufficient size to pass through them. In such an embodiment, the fingers have radially inwardly turned locking tabs on their ends that bend outwardly and snap below the shoulder 32.

The main features of the fastening means between the cap and base are that they are inexpensive to form, permit different angular orientation between the cap and the base and are not easily releasable from the outside so as to reduce theft. Of course, different spacings of the fasteners and different numbers of fasteners to provide for a larger number of possible orientations of the cap assembly are possible.

To receive the ground strap 24, conductive rivet 26 and printed circuit board 14, the upper housing within the base wall 30 has a flat circular bottom 38 with a central aperture 40 of sufficient size to tightly receive the conductive rivet 26. The inner surface of the base wall 30 includes an annular shoulder 41 above which the wall tapers to a relatively narrow edge. The annular shoulder 41 includes diametrically opposite to each other a rectangular recess 42 which receives a portion of the ground strap 24 and an aligning finger 43 which fits into a notch in the printed circuit.

Between the central aperture 40 in the bottom 38 of the inner compartment and the inner wall adjacent to the recess 42, is another cylindrical aperture 39 for receiving the coaxial cable 44, which passes through the base 22 for connection to the radio. The position of the aperture 39 is selected for ease of inserting the cable 44 during assembly. However, the cable could have been passed through the opening 40 or an opening at another location and grounded to the rivet 26.

To ground the outer conductor 45 of the coaxial cable 44, the ground strap 24 is a stamped metal conductor having a flat rectangular portion 46 with a central circular aperture 48 and a stem portion 50 extending therefrom and including an opening 52 of sufficient size to tightly clasp the outer conductor 45 of the coaxial cable 44. At the opposite end of the stem 50 from the rectangular conducting plate 46 is an upwardly extending arm 54 having at its end an outwardly turned horizontal tab 56 which fits within the recess 42, the arm 54 being the same height as the base wall 30 from the floor 38 to the lower edge of the recess 42. With this arrangement, the ground strap is positioned and held in place within the recess 42 by the printed circuit board 14 when the unit is assembled and lies along the wall 30 and floor 38 of the base housing, making an electrical connection between the outer conductor 45 of the coaxial cable and an area around the circumference of the central aperture 40 in the floor 38 of the base 22.

To electrically connect the conductive portion 46 to ground so as to complete a circuit between the outer conductor 45 of the coaxial cable 44 and ground, the conductive rivet 26 includes a conductive cylinder 60, an upper annular conductive flange 58 and a lower flange (not shown in FIG. 1) with the conductive cylinder 60 being of such a size and shape as to fit tightly within the central cylindrical opening 40 of the floor 38, the upper conductive annular flange 58 resting around it to make electrical connection with the conductive plate 46 of the ground strap 24. The conductive cylinder 60 of the conductive rivet 26 is sufficiently long to extend through the cylindrical aperture 48 and 40 and contact the clip 20 to complete a circuit between the conductive plate 46, the conductive rivet 26, the clip 20, and ground.

To provide an inductance for the antenna, the printed circuit board 14 includes a printed, conductive coil and three cylindrical, conductively coated apertures, eyelets or terminals, which are: (1) a central eyelet 61 for connecting the antenna to the coil printed on the surface of 62 of the printed circuit board 14; (2) a second eyelet 64 for electrically connecting the inner conductor of the coaxial cable 44 to the other end of the coil on the surface 62; and (3) a third eyelet 66 for making connection between the tab 56 of the ground strap 24 and the antenna 18. Aligned diametrically with the eyelets 61, 64 and 66 is a notch 68 in the outer periphery of the circular printed circuit board 14.

When the printed circuit board 14 is assembled, its outer periphery rests upon the shoulder 41 of the wall 30 with the notch 68 receiving the aligning finger 43 thereon and its eyelet 66 contacting the tab 56 of the ground strap 24 within the recess 42. The eyelet 64 is aligned with the opening for the coaxial cable 44 in the base 22 and receives the inner conductor of the coaxial cable in an electrical contact. The central eyelet 61 is positioned to make electrical contact with the antenna 18 in a manner to be described below.

To mount the antenna assembly 18 to the base 22, the mounting cap 16 includes a mounting skirt 70, a mounting boss 72, and an electrical connecting pin 74. The skirt 70 is shaped as a truncated cone and has a height equal to the height of the wall 30 on the base 22 and an inner diameter conforming closely to the outer diameter of the wall 30. At the bottom of the skirt 70, are four inwardly turned fingers, one being shown at 36 which conforms in size to the recesses 34A–34D in the wall 30 so that the cap assembly 16 may be moved over the wall 30, with the fingers 36 fitting within the recesses 34A–34D and the inner surface of the skirt 70 being in intimate contact with the outer surface of the wall 30 to hold the cap 16 to the base 22 in any of four rotational orientations about the vertical axis as described above.

To cover the printed circuit board and aid in holding it and the tab 56 in place, the cap assembly 16 includes an annular shoulder 76 between the mounting boss 72 and the skirt 70, with four sections 78 of a circular cylinder extending downwardly therefrom to contact the top surface 62 of the printed circuit board 14 and press it against the top surface of the tab 56 where it contacts the eyelet 66 on the printed circuit board 14.

To mount the radiator or whip assembly 18 to the mounting cap assembly 16, the mounting boss 72 is generally shaped as a section of a truncated cone, sectioned parallel to its longitudinal axis and extending from the top of the mounting cap assembly 16. On one side of the boss 72 is a flat vertical sliding surface meeting with a curved sliding surface 81 adjacent to the annular shoulder 76. A horizontal centrally located aperture 80 extends through the boss 72 parallel to the shoulder 76 and having its longitudinal axis located along the center of curvature of the sliding surface 81.

To provide an electrical connection between the eyelet 61 in the printed circuit board 14 and the radiator assembly 18, the conductive pin 74 has a downwardly extending conductive prong 82 which fits within an aperture (not shown in FIG. 1) in the sliding surface 81 and has a conductive lower portion sized to fit tightly within the eyelet 61 of the printed circuit board 14. The central location of the conductive prong 82 and eyelet 61 facilitate the rotational adjustability of the cap assembly 16 with respect to the base assembly 12. If they did not lie along the vertical axis of rotational adjustment, a different configuration would be necessary to permit such adjustment, such as four prongs and eyelets positioned symmetrically about the vertical axis and electrically connected together to accommodate the four different orientations of the cap assembly.

Above the prong 82 is a generally flat conductive plate having a surface 84 which fits against the mounting boss, having annularly positioned serrations 83 and 85 on it surrounding a central opening 87 which plate surface fits within the recess of the mounting boss 72 with the central opening being aligned with the central aperture 80 of the boss 72. A serrated conductive portion 86 (not shown in FIG. 1) on the opposite side of the conductive plate provides an electrical connection between the antenna and the prong 82 and also provides an adjustable contact for adjusting the whip assembly 18 in position.

The radiator assembly 18 includes a radiator 88 having a base portion 90, a rivet 92, and a spring 94. The base portion 90 has a curved bottom surface 96 with the same radius of curvature as the sliding surface 81 on the mounting boss 72. A central aperture 98 in the base 90 corresponds with the aperture 80 in the mounting boss 72 and lies along the longitudinal axis of the center of curvature of the sliding surface 81 and the curved surface 96 so that the rivet 92 may be inserted through the aligned apertures 98 and 80 in assembling the radiator assembly to the mounting cap assembly 16 to serve as a pivot pin.

Within the antenna base 90 is a curved recess 100 into which fits a serrated portion 102 of the radiator 88 forming a conductive circle around the aperture 98. When assembled, the rivet 92 forces the spring 94 against the base 90 and the serrated portion 102 against the conductive portion 86 of the pin 74, thus creating good electrical contact between the radiator 88 and the prong 82 and at the same time maintaining a level of friction that permits the radiator assembly 18 to be adjusted in angle with the curved surface 96 sliding against the sliding surface 81 and remain in position.

With the above construction, the mounting base 72 and radiator assembly 18 form an advantageous swivel top that permits the angular positioning of the radiator 88 with respect to the base 22. In the preferred embodiment, there are 24 serrations in the surface 86 of the pin 74 and the serrated portion 102 of the radiator 88, providing 15° increments of rotational adjustment of the radiator assembly 18 about the rivet 92. However, this number of serrations was selected to provide suitable increments of rotational adjustment while maintaining adequate strength of the serrations and ease of forming them. A larger or smaller number of serrations is possible if desired under some circumstances to provide smaller or larger increments of adjustment. Indeed, with a stronger spring 94 and smoother frictional surfaces instead of the serrations on surfaces 86 and 102, a continuous range of adjustments would be possible but the positive holding action of the ratchet adjustment formed by the serrations would be sacrificed for a pure frictional grip.

The ability to adjust the rotational position of the cap assembly 16 about the base assembly 12 cooperates with the adjustability of the radiator assembly 18 with respect to the mounting boss 72 in a particularly advantageous manner to permit the mounting of the antenna at different locations. For example, the antenna may be mounted to the hinged side of an automobile trunk lid and adjusted for a fifteen degree angle between the vertical axis and the antenna mast so that the mast slants away from the rear of the passenger compartment of the automobile. The same antenna may be mounted to the side of the trunk lid by rotating the cap assembly ninety degrees so that the mast can slant away from the rear of the passenger compartment with the antenna in the new location.

To mount the base 22 to the trunk of an automobile, the clip assembly 20 includes a flat horizontal mounting plate 104, two parallel horizontal U-shaped hook portions 106 and 108 and a connecting plate 110 connecting the horizontal mounting plate 104 to both parallel hook portions 106. The mounting plate 104 is of such a size as to fit within the skirt 28 and has a centrally located cylindrical hole 112 through it. The hole 112 is of such a size as to tightly receive the downwardly extending conducting rivet 60 when it is inserted through the aperture 40 in the base assembly 22.

The hook portions 106 and 108 each have two different pairs of parallel legs, with one leg of each pair being connected at its end to the edge of the plate 104 by the vertical connecting plate 110. There is sufficient space between the two legs of each pair of legs of the hook portions 106 and 108 to engage the trunk of an automobile and sufficient space between the two hook portions 106 and 108 to accommodate the coaxial cable 44 therebetween and permit it to pass into the trunk of the automobile.

Each of the hook portions 106 and 108 includes a bottom leg extending parallel to at least a portion of the plate 104 and having two threaded holes 118 and 114 respectively therethrough, to accommodate set screws one of which is shown at 120 and 116 respectively by which the hook portions 106 and 108 may be firmly mounted to the automobile. The parallel portions are joined at 126 by a section shaped to support the coaxial cable.

Figure 2:
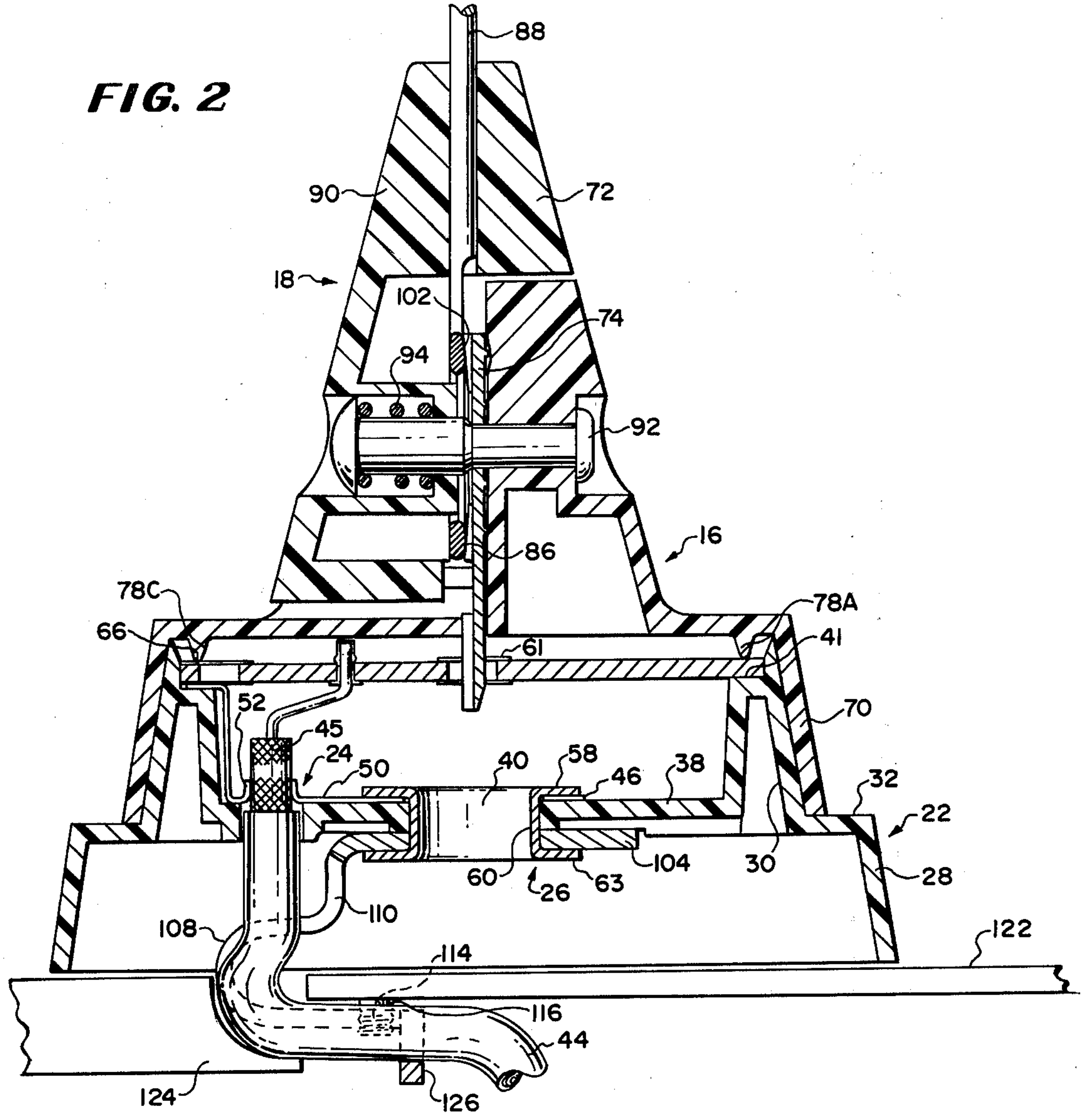
FIG. 2 is a fragmentary elevational sectional view of the antenna of FIG. 1.

In FIG. 2, there is shown an automobile trunk antenna mount 10 mounted to the edge of the lid 122 of the trunk of an automobile, with the edge of the lid 122 fitting within the clip 20 adjacent to the body 124 of the automobile. The two hook portions 106 and 108, 106 being shown in FIG. 1, fit at the place where the insulation normally rests between the trunk lid 122 and body 124 of the automobile, with the cable 44 passing between the hook portions 106 and 108 so as to lie within the trunk, the hook portion 108 only being shown in FIG. 2 since the hook portion 106 is on the opposite side of the cable 44. Screw 116 is threaded into the aperture 114 in leg 106 to press against the lid 122 and hold it tightly against the skirt 28.

The manner in which the conductive rivet 26 holds the mounting plate 104 of the clip 20 in place is best shown in FIG. 2. After the rivet 26 has been positioned through the aperture 40 with its top flange 58 resting along the edge of the conductive plate 46 of the ground strap 24, the bottom cylinder is bent outwardly at 63 to compress the under side of the plate 104 against the bottom wall 38 of the base 22 so as to form a firm mechanical connection between the clip 20 and the base 22 and a good electrical connection between the ground strap 24 and the clip 20. As shown in this figure, the ground strap 24 engages the outer conductor 52 of the coaxial cable 44 and the eyelet 66 of the printed circuit board 14 to complete the ground connection through the coil on the printed circuit board.

To form the relatively wide shoulder 41, the wall 30 is a double wall having two side walls of equal thickness joined at the shoulder 41. The printed circuit board 14 rests upon the shoulder 41 and is pressed thereagainst by the four sections of a cylinder 78A–78D of the mounting cap assembly 16, 78A and 78C being shown in FIG. 2, with the outer skirt 70 of the mounting cap assembly 16 fitting against the outer walls 30 of the base 22.

The spring biased rivet 92 presses base portion 90 of the antenna assembly 18 and the boss 72 together to force the serrated base 102 of the antenna 88 against the serrated portion 86 of the pin 74 to establish electrical contact through the pin 74 to the eyelet 61 of the printed circuit board 14, thus incorporating an inductance in circuit between the antenna 88 and the coaxial cable 44. The connection between the serrated pin 74 and the annular serrated base 102 of the antenna 88 also provides a mechanical contact between the antenna base 90 and the mounting boss 72, thus permitting the antenna base 90 to be pivoted about the rivet 92 to different angular positions, in which positions they remain until moved. Instead of a rivet 92, a bolt may be used for easier adjustment of the tension.

Figure 3:
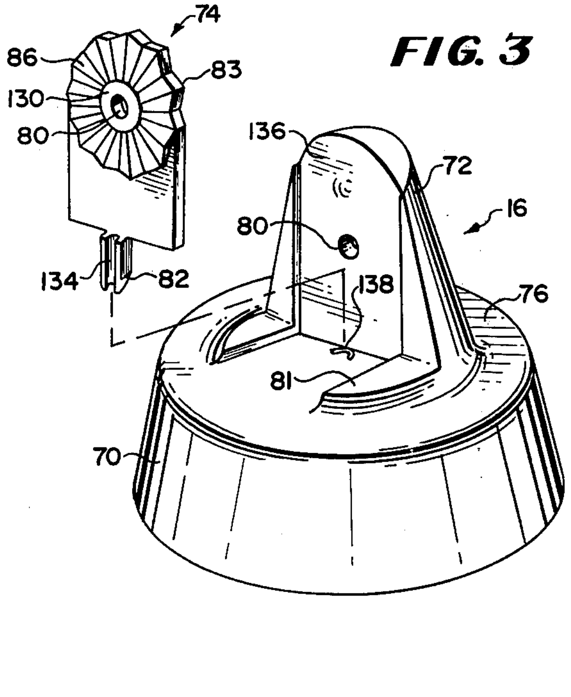
FIG. 3 is an exploded perspective view of a portion of the antenna of FIG. 1.

As best shown in FIG. 3, the side of the pin 74 facing the antenna base 90 has a smooth annular ring 130 surrounded by heavy serrations 86, positioned to engage with the serrations 102 in the base of the antenna to form a firm adjustable connection. The downwardly extending prong 82 is generally U-shaped so as to have a central groove 134.

To mount the pin 74 to the mounting cap assembly 16, the mounting boss 72 includes a flat recess 136 having a curved top and straight vertical sides conforming to the curved top and straight sides of the pin 74. To permit the downwardly extending prong 82 to pass into the mounting cap assembly 16 and to aid in mounting the pin 74, the shoulder 76 of the mounting cap assembly 16 includes a curved aperture 138 near the base of the recess 136 conforming in shape to the prong 82 so that the prong may pass into the skirt 70 and contact the printed circuit board 14 at the eyelet 61.

To prepare the antenna 88 and antenna mount 10 for mounting to the lid of a trunk 122 (FIG. 2), the ground strap 24 and the clip assembly 20 are positioned in place on the opposite sides of the plastic base 22 in the base assembly 12 and fastened together, after which the double stripped coaxial cable is inserted into the base and the outer conductor grounded to the ground strap. The printed circuit board 14 is positioned within the base and the inner conductor connected to it, after which the mounting cap assembly 16 is then inserted over the base with the conductive pin 74 being inserted into the printed circuit board 14. After this is done, the antenna assembly 18 is connected to the mounting boss 72.

Once assembled, the antenna mount 10 is mounted to the trunk lid by inserting the hook portions 106 and 108 over the edge of the trunk lid and tightening the set screws 116 and 120 in the threaded holes 114 and 118 respectively to hold the clip in place. The antenna 88 and base of the antenna 90 can be adjusted in position by physically moving the antenna so that the antenna assembly pivots about rivet 92 on the mounting boss 72 and it remains in its new position, being held by serrations 102 and 86.

To connect the clip 20 to the ground strap 24 and to the base 22, the clip 20 is positioned with its mounting plate 104 within the skirt 28, its aperture 112 in the mounting plate 104 aligned with the central aperture 40 in the floor 38 of the base 22 and the space between the hooks 108 and 110 aligned with the aperture 39 in the base 22. When the clip is properly positioned, the coaxial cable 44 that extends through the base 22 is able to pass between the two hook portions 106 and 108 of the clip 104. Next, the ground strap 24 is positioned in place within the compartment wall 30. When properly positioned the arm 56 is within the recess 42 in the shoulder 41 and the central aperture 48 is aligned with the central aperture 40 in the floor 38 of the base.

When the clip 104 and ground strap 24 are properly positioned, the conductive connecting rivet 26 is inserted through the apertures 48, 40 and 112 with its annular rim 58 overlying the ground strap 24. The end of the rivet 60 is then bent outwardly into the position shown at 63 in FIG. 2 to hold the ground strap 24 and clip 20 firmly together on opposite sides of the floor 38 of the base 22 and at the same time to make electrical connection between the ground strap 24 and the clip 20. The ground strap and clip are thus properly oriented and fastened in one operation.

To provide an electrical ground for the outer conductor of the coaxial cable 44, the outer insulation is stipped away from a portion to leave the bare outer conductor 45 and a portion of the outer conductor 45 and inner insulation is stripped away to leave a section of inner conductor. After the insulation has been stripped, the cable 44 is threaded through the aperture 39 in the floor 38 of the base 22 (FIG. 1) and, on the upper side, the coaxial conductor is threaded through the aperture 52 in the stem 50 of the ground strap until electrical contact is made between the outer conductor 45 and the ground strap 24. The outer conductor is then pressed against the ground strap and crimped or soldered. This grounds the outer conductor and fastens the end of the cable 44 to the antenna.

With the outer conductor 45 of the cable 44 is properly connected, the printed circuit board 14 is assembled with its rim overlying the annular shoulder 41 of the wall 30. When properly assembled, the eyelet 66 overlies the arm 56 of the ground strap 24 and the notch 68 receives the aligning finger 43 on the shoulder 41. The inner conductor is threaded through and electrically connected by crimping or soldering to the eyelet 64 of the printed circuit board 14 to provide an electrical connection to one side of the inductive loop on the printed circuit board, the other side of the inductor being electrically connected to the central eyelet 61. This holds the printed circuit in place within the base 22.

After the printed circuit board 14 is properly in place, the mounting cap assembly 16 is mounted to the base assembly 12 with the aligning fingers 36 each fitting into a different recess 34 and the inner surface of the skirt 70 engaging the outer surface of the wall 30. The fingers 36 provide a firm connection and align the mounting cap assembly 16.

Before the mounting cap assembly 16 is positioned on the base assembly, the pin 74 is inserted into it. Accordingly, the prong 82 engages the eyelet 61 in the printed circuit board 14 when the mounting cap assembly is assembled as best shown in FIG. 2. The pin is properly aligned by the U-shaped aperture 138 which matches the U-shaped prong 82.

The antenna assembly 18 is mounted to the pin and the mounting post 72, with the central apertures 98, 87 and 80 being aligned and the curved portion 96 of the base 90 resting within the curved portion of the mounting post 72. In this position, the serrated edge 102 of the base of the antenna 88 engages a serrated face 86 of the pin 74 and another serrated face 83 of the pin 74 engages the post 72. The rivet 92 and spring 94 are positioned and the rivet is bent outwardly to firmly fasten the antenna in place. However, the antenna is spring biased so that it may be adjusted in position by rotating it.

The serrated portion 102 of the radiator is formed by annealing the end of the hardened radiator 88 by induction heating and quenching, inserting it into the base portion 90, forming it into a loop and forming the serrations by swedging. The portion of the radiator 88 that is above the base 90 and near the top is not heated during the annealing process so that it retains its strength, hardness and elasticity.

Once the antenna 10 is mounted together, it is inserted over the edge 122 of the lid of a trunk. To mount it to the lid of a trunk, the hook portions 106 and 108 are pulled over the edge of the trunk between the hinges and the set screws 116 and 120 are threaded into the holes 112 and 106 respectively against the under side of the lid 122. When mounted in place, the hook portions 106 and 108 are within the jam of the trunk lid at a cutaway portion of the insulation and the coaxial cable extends between the hook portions 106 and 108 into the interior of the trunk. In this position, the trunk lid may be closed with the antenna mounting fastened and yet no damage need be done to the body of the car such as by drilling holes or the like.

The radiator 88 may be adjusted in position by rotating it to the desired angle once it is assembled to the trunk of the car for final adjustment. Moreover, at times it may be desirable to change the angle of the antenna upon opening or closing of the lid of the trunk. The plane in which it is adjusted may be rotated 90° by changing the rotational orientation of the cap assembly with respect to the base by 90°.

From the above description it can be seen that the antenna mount of this invention has the advantages of being less expensive than comparable prior art antennas, relatively theft proof, and easily adjustable to a number of positions.

It is easily adjustable because it includes the spring loading and serrated electrical connection between the base 102 of the whip antenna 88 and the pin 74 that connects the antenna electrically to the printed circuit board 14. It is less expensive to fabricate because of its ease of assembly and manufacture. It is easily assembled because the grounding of the outer conductor of a coaxial cable is simplified by the arrangement including the ground strap 24, rivet 26 and clip 20. Moreover, the assembly of the printed circuit board and mast are simplified by the construction. The snapon construction of the cap assembly further facilitates fabrication and assembly and also causes the antenna to be relatively theft proof.

Although a preferred embodiment has been described with some particularity, many modifications and variations in the preferred embodiment are possible within the light of the above teachings and without deviating from the invention. Accordingly, it is to be understood, that within the scope of the appended claims, the invention may be practiced other than as specifically described.

What is claimed is:

1. An antenna comprising:
an antenna base;
said base including a bottom wall having a top surface and a bottom surface;
mounting bracket means for mounting the antenna base to a surface of a vehicle;
means for receiving a coaxial cable having inner and outer conductors;
means for mounting an antenna mast to said base;
a ground strap;
said ground strap including means for intimately engaging the outer conductor of said coaxial cable;
means for electrically and mechanically connecting said mounting bracket means and ground strap together;
said means for electrically and mechanically connecting said mounting bracket means and ground strap together comprising means for holding said ground strap on the top surface of said bottom wall of said base and for holding said mounting bracket means to said bottom surface of said base bottom wall;
said means for electrically and mechanically connecting including internal walls defining an opening in the bottom wall of said base;
said ground strap being positioned on the top surface of said bottom wall and one surface of said mounting bracket means being positioned on the bottom surface of said wall;
said means for electrically and mechanically connecting having a first portion passing through said hole, a second portion overlying said ground strap and a third portion positioned underneath said surface of said mounting bracket means, whereby said bottom wall, ground strap and surface of said mounting bracket means are compressed together.

2. An antenna according to claim 1 in which said ground strap comprises:
internal walls defining a first opening;
said first portion of said means for electrically and mechanically connecting passing through said first opening;
said second portion of said means for electrically and mechanically connecting overlying said ground strap adjacent to said first opening;
said means for intimately engaging the outer conductor including internal walls of said ground strap defining a second opening, whereby said outer conductor may be grounded.

3. An antenna according to claim 2 in which said means for holding is a rivet.

4. An antenna according to claim 3 further comprising:

a printed circuit board having at least first, second and third conductive terminals;

said printed circuit board being mounted within said base;

an antenna being electrically connected to said first conductive terminal of said printed circuit board;

said central conductor of said coaxial cable being connected to said second conductive terminal of said printed circuit board;

said ground strap including means for making electrical contact with said third conductive terminal of said printed circuit board.

5. An antenna according to claim 4 in which said means for holding an antenna mast to said base includes a serrated electrical conductor adapted to engage said antenna mast.

6. An antenna according to claim 3 further comprising:

an antenna mast;

a portion of said antenna mast having a serrated base;

said means for mounting including a serrated conductor;

said serrated base engaging said serrated conductor of said means for mounting an antenna;

a pivot pin;

said pivot pin connecting said serrated base in said means for mounting said antenna mast whereby said base and means for mounting are held in rotatable engagement.

7. An antenna according to claim 6 further including a spring biasing means for biasing said antenna mast base and said means for mounting said antenna mast together.

8. An antenna according to claim 5 further including a spring biasing means for biasing said antenna mast base and said means for mounting said antenna mast together.

9. An antenna according to claim 2 further comprising:

an inductive coil;

said inductive coil being mounted within said base;

first, second, and third electrical contacts at different locations in the windings of said inductive coil;

said antenna being electrically connected to the first terminal of said coil;

a second terminal of said coil being electrically connected to the central conductor of said coaxial cable;

the third terminal of said coil being electrically connected to said ground strap.

10. An antenna comprising:

an antenna base;

an antenna cap;

said antenna cap including means for holding an antenna mast;

said antenna base including means for mounting to a bracket;

said antenna base and said antenna cap being plastic;

one of said antenna base and said antenna cap having internal walls defining openings;

the other of said antenna cap and antenna base having aligning projections;

said antenna cap being positionable over said antenna base with aligning projections fitting into said openings;

a bracket;

means for receiving a coaxial cable having inner and outer conductors;

means for electrically and mechanically connecting said cable to an antenna;

a ground strap;

said ground strap including means for intimately engaging the outer conductor of said coaxial cable;

means for electrically and mechanically connecting said mounting bracket and ground strap together;

said base including a lower wall having top and bottom surfaces; and said means for electrically and mechanically connecting said mounting bracket and ground strap together comprises means for holding said ground strap on said top surface of said wall and for holding said mounting bracket to said bottom surface of said wall.

11. An antenna in accordance with claim 10 in which:

said means for holding includes internal walls defining an opening in a bottom wall of said base;

said ground strap being positioned on the top surface of said bottom wall and one surface of said bracket being positioned on the bottom surface of said wall;

said means for holding having a first portion passing through said opening in said bottom wall, a second portion overlying said ground strap and a third portion positioned on the opposite side of said bracket as said wall, whereby said bottom wall, ground strap and surface of said bracket are compressed together.

12. An antenna according to claim 11 in which said ground strap comprises:

internal walls defining an opening in said ground strap;

said first portion of said means for holding passing through said opening in said ground strap;

said second portion of said means for holding overlying said ground strap adjacent to said opening;

said means for engaging said outer conductor including internal walls in said ground strap defining a second opening.

13. An antenna comprising:

an antenna base;

an antenna cap;

said cap including means for holding an antenna mast;

a first axis passing through said antenna base, antenna cap and means for holding an antenna mast;

a second axis at an angle to said first axis;

said antenna cap and antenna base and means for holding being aligned with each other in the direction of the first axis;

said antenna base including means for mounting to the trunk of an automobile;

means for mounting said antenna cap to said base in any of a plurality of rotational positions about said first axis;

said means for holding an antenna mast including means for holding said antenna mast at any of a plurality of angles with respect to the cap about said second axis, whereby said antenna may be mounted at a selected angle with respect to the surface of said automobile trunk and extend at that angle in any of a plurality of selected directions from said antenna base;

an inductive coil;
means for receiving a coaxial cable having inner and outer conductors;
said inductive coil being mounted within said antenna base;
said inductive coil being electrically connected to said antenna mast and to the central conductor of said coaxial cable;
said base and said cap being plastic;
one of said base and said cap having internal walls defining openings;
the other of said cap and base having aligning projections; and
said cap being positionable over said hub with said aligning projections fitting into said opening.

14. An antenna comprising:
an antenna base;
an antenna cap;
said cap including means for holding an antenna mast;
a first axis passing through said antenna base, antenna cap and means for holding an antenna mast;
a second axis at an angle to said first axis;
said antenna cap and antenna base and means for holding being aligned with each other in the direction of the first axis;
said antenna base including means for mounting to the trunk of an automobile;
means for mounting said antenna cap to said base in any of a plurality of rotational positions about said first axis;
said means for holding an antenna mast including means for holding said antenna mast at any of a plurality of angles with respect to the cap about said second axis, whereby said antenna may be mounted at a selected angle with respect to the surface of said automobile trunk and extend at that angle in any of a plurality of selected directions from said antenna base;
an inductive coil;
means for receiving a coaxial cable having inner and outer conductors;
said inductive coil being mounted within said antenna base;
said inductive coil being electrically connected to said antenna mast and to the central conductor of said coaxial cable;
said means for holding an antenna mast to said base includes a serrated electrical conductor adapted to engage said antenna mast;
an antenna mast;
a portion of said antenna mast having a serrated base;
said means for mounting including a serrated conductor;
said serrated base engaging said serrated conductor of said means for mounting an antenna;
a pivot pin;
said pivot pin connecting said serrated base in said means for mounting said antenna mast whereby said base and means for mounting are held in rotatable engagement;
a spring biasing means for biasing said antenna mast base and said means for mounting said antenna mast together;
said base and said cap being plastic;
one of said base and said cap having internal walls defining openings;
the other of said cap and base having aligning projections; and
said cap being positionable over said hub with said aligning projections fitting into said opening.

* * * * *

UNITED STATES PATENT AND TRADEMARK OFFICE

CERTIFICATE OF CORRECTION

PATENT NO. : 4,115,779

DATED : September 19, 1978

INVENTOR(S) : Danny M. Dantzler, et al

It is certified that error appears in the above-identified patent and that said Letters Patent are hereby corrected as shown below:

Assignee should be changed from Instrumentation Specialties Company to Hy-Gain Electronics Corporation Column 7, line 21, the number 52 should be 45

Column 8, line 47, the word "stipped" should be "stripped"

Column 8, line 61, the word "With" should be "When"

Column 12, line 2, the word "said" should be inserted before the word "aligning".

Signed and Sealed this

***Sixteenth* Day of *January 1979***

[SEAL]

*Attest:*

DONALD W. BANNER

*Commissioner of Patents and Trademarks*

RUTH C. MASON

*Attesting Officer*